May 31, 1932.  F. BORTONE  1,860,649
PACKING AND METHOD OF MAKING SAME
Filed July 8, 1929

Frank Bortone INVENTOR
Wm. J. Pritchard ATTORNEY

Patented May 31, 1932

1,860,649

UNITED STATES PATENT OFFICE

FRANK BORTONE, OF JERSEY CITY, NEW JERSEY, ASSIGNOR TO THE DORIN CORPORATION, OF JERSEY CITY, NEW JERSEY, A CORPORATION OF NEW JERSEY

PACKING AND METHOD OF MAKING SAME

Application filed July 8, 1929. Serial No. 376,527.

This invention relates to packings and more particularly to packings having definite contours and to the method of making the same.

It has for an object the provision of packings molded in any desired shape.

Another object of this invention is to provide a packing material of predetermined form, including means whereby its shape may be maintained and handling thereof permitted.

A further object of this invention comprises packings of predetermined shapes having coverings thereon which are frangible and easily disrupted in use but possess sufficient strength to permit handling thereof.

A specific object of this invention is to provide packings having predetermined shapes coated with compositions including cellulose derivatives.

An additional object of this invention is to provide methods for producing packings above set forth.

Other objects will appear from the following description, appended claims and accompanying drawings in which:

Figure 1:
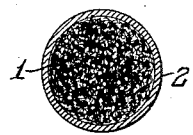
Figure 1 is a cross-section of a cylindrical packing forming one part of this invention.
Figure 2:
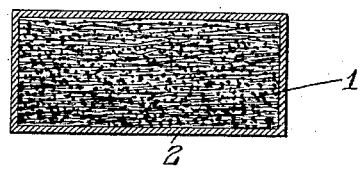
Figure 2 is a cross-section of a flat or strip packing comprising another part of this invention.
Figure 3:
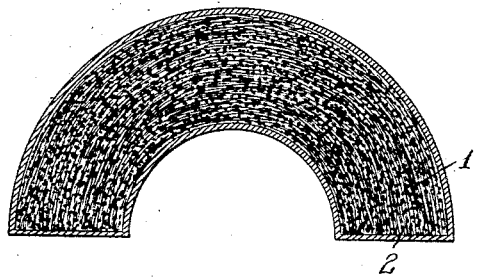
Figure 3 is a cross-section of a packing having a hemispherical shape constituting another modification of this invention.
Figure 4:
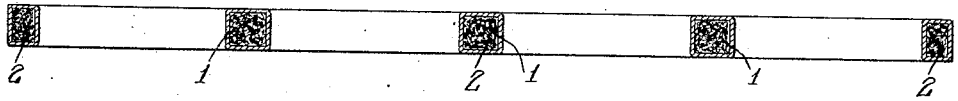
Figure 4 is a gasket produced according to this invention.

Referring now to the drawings wherein like reference numerals designate like parts, the reference numeral 1 designates the packing composition. This composition may be formed of any desired ingredients. It may include anti-friction metallic chips, asbestos fibers and/or graphite, and any suitable binder such as oils, waxes, resins, or that described and set forth in my copending application Serial No. 376,852 of even date. By subjecting this composition to a molding operation a packing of any predetermined form may be obtained. If a shaped packing, such as illustrated in Figures 1 and 2, is desired the plastic packing composition may be molded in any suitable mold or it may be extruded under high pressure through a die having an aperture of the desired shape and size. In making the half-ring packing illustrated in Figure 3, each half may be individually molded or the mass may be molded in semi-circular form and then cut to the desired thickness. These half-rings may be formed of packing having any desired cross-section. On the other hand, if it is desired to make a packing in the form of a gasket, as illustrated in Figure 4, the composition may be introduced into a mold and the product molded. Or, the composition may be first sheeted in any suitable manner and then formed into the desired form by stamping.

When the packing composition is formed in various shapes, there may be a tendency for a packing to become distorted or fall apart. To overcome this, the molded packing is provided with a covering or coating 2 which possesses sufficient strength to permit handling, but is frangible and easily disrupted in use. Preferably, the material forming the covering is one which does not abrade the moving parts. Various materials may be used for forming this covering. I have found that satisfactory results may be obtained by forming the coatings of paints, particularly those including asphaltic materials and rubber; varnishes; lacquers or plastic compositions including cellulose derivatives, such as nitrate, acetate, ether, etc., with or without plasticizers; natural or artificial resins dissolved in volatile solvents or formed into plastic compounds; plastic compositions or solutions in solvents, volatile or otherwise, of gelatin, gums, waxes, etc. If desired, the extruded mass may be braided with artificial silk produced from viscose, cuprammonium cellulose, denitrated cellulose nitrate, or cellulose acetate. The extruded mass also may be wrapped with various materials, such as preformed sheets or ribbons of regenerated cellulose.

The coverings above-described may be formed in any well-known manner. If desired, the packing composition may be molded or extruded from dies in definite lengths and the coverings then applied. For instance, these lengths of packings may be disposed on racks or the like and immersed in a bath containing the desired coating materials. In this method, after immersion, the coated materials are withdrawn from the bath and the coatings permitted or caused to set. Instead of immersing definite lengths of the material in a bath, the extruded mass, as it is ejected from the die, may be caused to issue into a bath of the coating material from which it may be withdrawn and whereby it will be suitably coated. In cases where the immersion of the packing is not practical, the packing as it is extruded from the die may be passed through a coating mechanism comprising a plurality of spray mechanisms whereby it may be coated.

Figure 5:
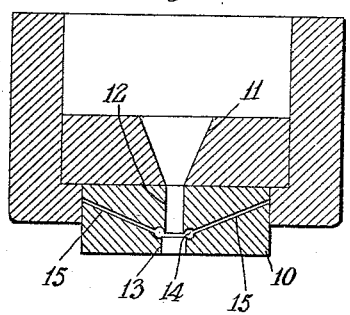
Figure 5 is a sectional view of the preferred apparatus used in the manufacture of the packings illustrated in Figures 1 to 3 incluusive.

In cases where a plastic composition is to be used for forming the coating or covering, various methods may be used. The molded packing may be coated with the plastic coating composition and then again extruded, whereby the coating is made to conform to the shape of the packing. The covering may also be formed simultaneously with the extrusion of the packing. To carry out the last-named method the apparatus illustrated in Figure 5 may be used. This apparatus comprises a removable die 10. At the inner end thereof it is formed with a gate 11 through which the composition is forced into the die. The gate 11 registers with a passage 12 extending through the die. At the outer end thereof the passage 12 is formed slightly larger in size than the remainder of said passage as indicated at 13. Adjacent the enlarged portion 13 there is an annular distributing chamber 14 and communicating therewith is a plurality of channels 15 through which the plastic composition adapted to form the coating may be supplied. Thus, in carrying out this method the packing composition is forced under pressure into the gate and through the die. After the packing has been shaped and prior to or simultaneously with the entrance thereof into the enlarged passage 13, it is enveloped or surrounded with the plastic coating composition introduced through the channels 15. Continuation of the extruding process forms the coating composition and makes it conform to the shape of the packing.

The shaped packings produced as above-described comprise molded materials of definite shape and size having casings, coverings or coatings which permit handling thereof. The packing, if in the form illustrated in Figures 1 and 2, is wrapped one or more times around the shaft and forced into the box or gland by any suitable tool or by the follower. If the half-ring type is used, two sections or multiples thereof are disposed around the shaft and forced into the gland as above-described. In use, the covering is substantially immediately broken and disrupted whereby the packing composition is permitted to function. Since the covering is made of a non-abrasive material, the moving parts are not injured or damaged thereby.

Since it is obvious that various changes may be made in the specific details above-described, this invention is not limited thereto except as set forth in the following claims:

I claim:

1. A method of making packings of predetermined shapes which comprises molding a packing composition and applying a covering thereto which is frangible and easily disrupted in use.

2. A method of making packings of predetermined shapes which comprises extruding a packing composition through a die and applying a covering thereto which is frangible and easily disrupted in use.

3. A method of making packings of predetermined shapes which comprises extruding a packing composition through a die, applying thereto a composition containing a cellulose derivative to form a coating, and permitting said coating to set.

4. A method of making packings of predetermined shapes which comprises extruding a packing composition through a die, applying thereto a composition including cellulose nitrate to form a coating, and allowing said coating to set.

5. A method of making packings of predetermined shapes which comprises extruding a packing composition and applying a composition containing a cellulose derivative to the shaped packing to form a coating prior to the exit of the packing from the die.

6. A packing comprising a packing composition having a covering, said covering being frangible and easily disrupted in use and possessing sufficient strength to permit handling, said packing having a definite shape and form.

7. A packing comprising a molded composition having a covering of a non-abrasive material, said covering being frangible and easily disrupted in use and possessing sufficient strength to permit handling.

8. A packing comprising a die-extruded composition having a covering of a non-abrasive material, said covering being frangible and easily disrupted in use and possessing sufficient strength to permit handling.

9. A packing comprising a coated molded composition, the coating being frangible and easily disrupted in use and possessing sufficient strength to permit handling.

10. A packing comprising a molded composition having a coating comprising a cellulose derivative.

11. A packing comprising a molded composition having a coating comprising cellulose nitrate.

In testimony whereof, I have affixed my signature to this specification.

FRANK BORTONE.